Patented Sept. 30, 1952

2,612,486

UNITED STATES PATENT OFFICE 2,612,486

STYRENE-MONOALKYL MALEATE-POLY-VINYL ALCOHOL INTERPOLYMERS EMULSION ADHESIVE AND PROCESS OF PREPARING SAME

Martha E. Cameron, Seattle, Wash., assignor to Monsanto Chemical Company, St. Louis, Mo., a corporation of Delaware No Drawing. Application July 7, 1950, Serial No. 172,617

8 Claims. (Cl. 260—29.6)

This invention relates to a new emulsion adhesive comprising the interpolymerization of styrene with mono- 1 to 4 carbon atom alkyl maleates in the presence of polyvinyl alcohol and a catalyst.

Many synthetic resin adhesives are utilized in specialty applications by formulating with a volatile organic solvent which is subsequently removed. In general the use of organic solvents precludes a widespread commercial utilization of the adhesive formulation in wood-bonding processes, such as the plywood industry, because of the loss of relatively expensive solvent, the potential toxicity and fire hazard of many organic solvent vapors, the characteristics of many synthetic resins to retain the solvent providing a solvated resin of inferior properties, and the relative difficulty of providing easy removal of the solvent from the glue line where the bonded surfaces are large. Thus, water, which does not have the aforementioned detrimental properties, has become the preferred solvent or carrier for most wood adhesives.

In order to provide water solutions of adhesives, various hydrophilic salts of synthetic resins have been developed. The adhesives of many of these formulations, however, retain their hydrophilic groups and are thus lacking in water-resistance for many applications. To avoid this deficiency, volatile bases have been employed to temporarily provide the hydrophilic groups necessary to prepare a water solution of the adhesive. Whereas this method of applying a water-resistant synthetic resin coating is generally satisfactory, the application of the same formulation as a wood-bonding adhesive does not generally provide conditions which enable the development of adequate water-resistance of the glue bond, as for example, films formed from a solution of a heteropolymer of styrene ammonium n-butyl maleate, when air dried or dried at an elevated temperature, were water insoluble, whereas the application of the above heteropolymer as an adhesive applied to maple blocks and pressed at 250 p. s. i. failed when dry shear tested at about 2400/0, that is, required 2400 p. s. i. stress to rupture the glue bond, but the wet shear result, wherein the heteropolymer was applied to birch and pressed at 200 p. s. i., was only from about 0/0 to 17/0, indicating little water-resistance.

Polyvinyl acetate emulsion adhesives have recently been introduced for commercial glueing applications such as furniture joints, etc. This adhesive has the advantage of quick cold setting (10 to 30 minutes), long pot life, and is colorless. These adhesives, however, suffer from their poor resistance to elevated temperatures which accelerate the inherent property of polyvinyl acetate adhesives known as "cold flow" causing the failure of the adhesive bond when under stress. Further, the polyvinyl acetate emulsion adhesives have a restricted utility because of their poor water-resistance, lack of resistance to certain paint solvents, and failure to produce a high percentage of wood failure when stressed to destruction.

It has now been found that the interreaction of styrene with mono- 1 to 4 carbon atom alkyl maleates in the presence of polyvinyl alcohol and an interpolymerization catalyst in an external water phase provides an emulsion adhesive with greatly improved resistance to stress at elevated temperatures and with improved water-resistance.

This new emulsion adhesive may be used either alone or with fillers, for example, dextrin, pulverized nut shell flour, Bulzie wheat flour, etc. These fillers show no decrease in adhesive properties when used up to a level of about 10 per cent based on 100 parts of emulsion containing from about 35 to 40 per cent adhesive total solids. The new emulsion adhesive is compatible with polyvinyl acetate emulsion adhesives and may be applied therewith to obtain a formulation having faster setting time than the styrene mono-alkyl maleate adhesives and superior adhesive properties to the polyvinyl acetate emulsion when applied alone.

The following examples are illustrative of the invention:

Example 1

A 3-liter, 3-necked flask was equipped with a reflux condenser, thermometer and stainless steel anchor-type stirrer and the following ingredients were added in the order named, parts being by weight:

| | |
|---|---:|
| Polyvinyl alcohol | 90 |
| Mono-methyl maleate | 396 |
| Styrene | 316 |
| Water | 1170 |
| Hydrogen peroxide (30%) | 33 |

The polyvinyl alcohol referred to above was a high viscosity substantially completely hydrolyzed (99 per cent) material. The stirrer was set at about 150 R. P. M. The reaction mixture was brought to reflux which ranged from about 90 to 94° C. and small homogeneous samples were removed every half hour for 3.5 hours. The samples obtained during this reaction were allowed to cool to room temperature and evaluated by preparing fir test-blocks as a measure of the adhesive characteristics of the emulsion versus reaction time. It was found that the reaction went through a very short gel stage after a reaction time of about 1.5 hours as determined on the cooled samples. The maximum adhesion coincides with this high viscosity; however, this adhesive would be difficult to spread and difficult to handle at this high consistency. Accordingly, the reaction may be terminated before the gel stage is reached with substantially equivalent adhesive results or the reaction may be advanced beyond the gel stage, which additional reaction refluidifies the heteropolymer such that the emulsion adhesive may be readily applied. Preferably the reaction is terminated after about 2 to 2.5 hours refluxing, but aside from the short gel period after about 1.5 hours reaction time the emulsion is a suitable adhesive throughout the 0.5 to 3.5 hours reaction period.

The adhesion of this novel emulsion adhesive was compared against a commercial polyvinyl acetate emulsion adhesive at temperatures of 70, 140 and 180° F. as shown in the following table:

| Wood | Temp., °F. | TA (min.) | Adhesion | |
|---|---|---|---|---|
| | | | PVAc (50% TS) | Ex. 1 (35% TS) |
| Maple | 70 | 20 | 2410/5 | 3840/65 |
| Fir | 140 | 10 | 453/0 | 1213/100 |
| Fir | 140 | 20 | 620/0 | 1325/88 |
| Maple | 140 | 10 | 615/0 | 877/1 |
| Maple | 140 | 20 | 475/0 | 1035/2 |
| Fir | 180 | 10 | 284/0 | 1222/100 |
| Fir | 180 | 20 | 800/0 | 1172/100 |
| Maple | 180 | 10 | 967/0 | 2070/41 |

The above adhesion evaluation designations for example 2410/5 indicate that the test piece broke when a stress of 2410 p. s. i. was applied and there was 5 per cent wood failure. The spread employed in the above evaluations was about 50 pounds of emulsion per 1000 square feet of single glue line. The time of assembly (TA) is the time between coating the adhesive onto the test blocks and the application of bonding pressure (250 p. s. i. for maple and 200 p. s. i. for fir).

This novel emulsion adhesive exhibits excellent resistance to deemulsification since it readily passes 6 cycles of alternately freezing and storing at 150° F. without the appearance of a measurable separation or any loss of adhesive properties.

The ratio of styrene to mono-methyl maleate was varied from about 0.7:1 to about 2.3:1 without greatly affecting the adhesive characteristics of the emulsion; however, the approximate 1:1 ratio provided the maximum adhesive results.

*Example 2*

The following ingredients were added to a similar apparatus to that of Example 1, parts being by weight:

| | |
|---|---|
| Polyvinyl alcohol | 52.5 |
| Mono-methyl maleate | 417 |
| Styrene | 333 |
| Water | 727 |
| Hydrogen peroxide (30%) | 33 |

The polyvinyl alcohol referred to above was a high viscosity substantially completely hydrolyzed (99 per cent) material. These materials were heated to 80° C. and held at that temperature for 20 hours while maintaining constant agitation. The emulsion adhesive of this example also exhibited superior resistance to failure when exposed to elevated temperatures while under stress.

Other suitable mono- 1 to 4 carbon atom alkyl maleate monomers are, for example, mono-ethyl maleate, mono-propyl maleate, mono-butyl maleate and mixtures thereof.

Excellent emulsion adhesives were obtained when the polyvinyl alcohol was varied from about 15 to about 30 parts by weight per 100 parts by weight of styrene. Whereas a substantially completely hydrolyzed polyvinyl alcohol was employed in the examples and is the preferred material, other grades of polyvinyl alcohol which were at least about 75 per cent hydrolyzed were found to be applicable.

Other peroxygen interpolymerization catalysts may be employed for hydrogen peroxide, as for example, tert.-butyl hydroperoxide, di-tert.-butyl peroxide, acetyl peroxide, benzoyl peroxide, lauroyl peroxide, potassium persulfate, sodium perborate and the like.

The emulsion adhesive of this invention has been found to be satisfactory at from about 30 to about 60 per cent total solids. The concentration of emulsion adhesive selected will, of course, be dependent upon the intended application as is readily understood by those familiar with the art.

This novel emulsion adhesive sets in from about 30 to about 90 minutes when allowed to stand at room temperature. It is understood that heat may be applied to accelerate the setting of the glue bond, as for example, the employment of a hot press. The application of heat also provides an improved water-resistant glue bond presumably by providing greater interaction of the adhesive with the strongly polar hydroxyl groups of the cellulosic material or additional interaction of the carboxyl groups and the hydroxyl groups of the adhesive.

The excellent stability of the novel emulsion adhesive of this invention enables its employment as a general utility household adhesive. The adhesive can also be employed for glueing furniture, plywood and the like.

I claim:

1. An aqueous emulsion adhesive comprising the interreaction product of (A) from about 0.7 to about 2.3 moles of styrene, (B) 1.0 mole of mono- 1 to 4 carbon atom alkyl maleate, and (C) from about 15 to about 30 parts by weight of high viscosity, substantially completely hydrolyzed polyvinyl alcohol per 100 parts by weight of styrene, wherein the said interreaction product is prepared in the presence of a peroxygen interpolymerization catalyst and an external water phase at a temperature of from about 80° C. to the reflux temperature of said mixture for from about 0.5 to about 20 hours to provide an emulsion adhesive characterized by a spreadable consistency and a resistance to failure when exposed to temperatures up to 180° F. while under stress.

2. The aqueous emulsion adhesive of claim 1 wherein the mole ratio of styrene to mono-alkyl maleate is substantially 1:1.

3. An aqueous emulsion adhesive comprising the interreaction product of (A) from about 0.7 to about 2.3 moles of styrene, (B) 1.0 mole of mono-methyl maleate, and (C) from about 15 to about 30 parts by weight of high viscosity, substantially completely hydrolyzed polyvinyl alcohol per 100 parts by weight of styrene, wherein the said interreaction product is prepared in the presence of a peroxygen interpolymerization catalyst and an external water phase at a temperature of from about 80° C. to the reflux temperature of said mixture for from about 0.5 to about 20 hours to provide an emulsion adhesive characterized by a spreadable consistency and a resistance to failure when exposed to temperatures up to 180° F. while under stress.

4. The aqueous emulsion adhesive of claim 3 wherein the mole ratio of styrene to mono-methyl maleate is substantially 1:1.

5. The process which comprises reacting a mixture of (A) from about 0.7 to about 2.3 moles of styrene, (B) 1.0 mole of mono- 1 to 4 carbon atom alkyl maleate, and (C) from about 15 to about 30 parts by weight of high viscosity, substantially completely hydrolyzed polyvinyl alcohol per 100 parts by weight of styrene in the presence of a peroxygen interpolymerization catalyst and an external water phase at a temperature of from about 80° C. to the reflux temperature of said mixture for from about 0.5 to about 20 hours to provide an emulsion adhesive characterized by a spreadable consistency and a resistance to failure when exposed to temperatures up to 180° F. while under stress.

6. The process of claim 5 wherein the mole ratio of styrene to the mono-akyl maleate is substantially 1:1.

7. The process of claim 6 wherein the maleate is mono-methyl maleate.

8. The process of claim 7 wherein the reaction is carried out at the reflux temperature for a period of from about 2 to 2.5 hours.

MARTHA E. CAMERON.

REFERENCES CITED

The following references are of record in the file of this patent:

UNITED STATES PATENTS

| Number | Name | Date |
|--------|------|------|
| 2,419,880 | Blyler et al. | Apr. 29, 1947 |
| 2,537,016 | Barrett | Jan. 9, 1951 |